(No Model.)
G. T. BECHTOL.
DIFFERENTIAL CALIPER POINT.
No. 482,331. Patented Sept. 13, 1892.
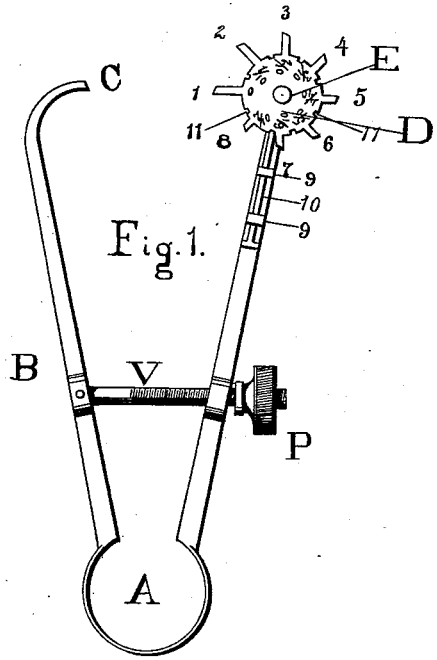
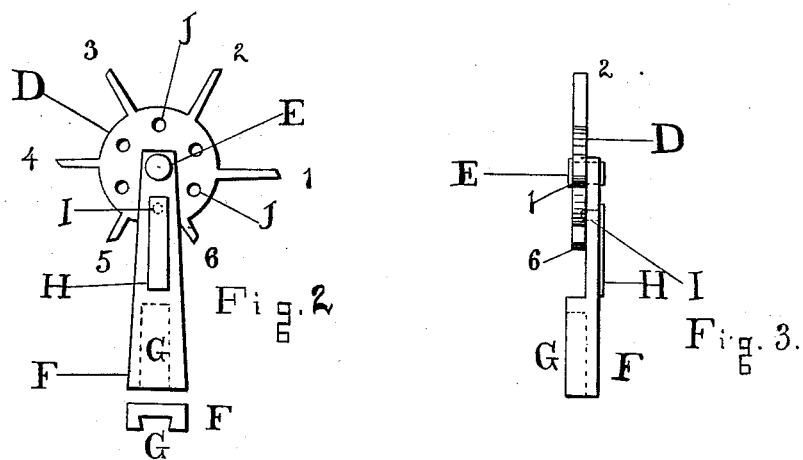
WITNESSES:
James Cosgrove
Wm. Tallman
INVENTOR
G. T. Bechtol
BY
John W. Loveland
ATTORNEY

UNITED STATES PATENT OFFICE.

GEORGE T. BECHTOL, OF ELMIRA, NEW YORK, ASSIGNOR OF ONE-HALF TO FRED. W. PARSONS, OF SAME PLACE.

DIFFERENTIAL CALIPER-POINT.

SPECIFICATION forming part of Letters Patent No. 482,331, dated September 13, 1892.

Application filed March 15, 1892. Serial No. 425,068. (No model.)

*To all whom it may concern:*

Be it known that I, GEORGE T. BECHTOL, a citizen of the United States, residing in the city of Elmira, county of Chemung, State of New York, have invented a new and useful Improvement in Measuring Devices, of which the following is a full, clear, and exact description, reference being had to the accompanying drawings, forming part of this specification.

My invention relates to instruments for measuring objects by increasing or diminishing the distance between the contact-points.

The object of my invention is to, first, provide means for easily and accurately adjusting the contact-points; second, to do this without altering the adjustment of the joint itself, and, third, to provide means for making the amount of this adjustment definite and certain.

These ends I accomplish by the device illustrated in the accompanying drawings, which form a part of this specification, and in which similar letters and figures of reference refer to similar parts throughout the various views.

Figure 1 is a side elevation showing the various parts assembled, illustrating one means of accomplishing the proposed ends. Fig. 2 is an elevation of a modification of this device, showing it as made in form of an attachment to be applied to any calipers. Fig. 3 is a side elevation of the device shown in Fig. 2, showing, also, another means for locking the wheel.

Referring to Fig. 1, B B represent the ordinary calipers, with a screw adjustment V P either inside, as in this instance, or outside.

A is the spring-joint.

C is the usual contact-point.

The wheel D, revolving on the pivot E, may be made a permanent part of the caliper-leg, as in Fig. 1, or may be part of an attachment, as in Figs. 2 and 3. In Fig. 1 the wheel D has spokes or pins 1 2 3 4 5 6, varying from each other in length by some definite fraction of a unit of measure, as tenths of an inch, &c. The wheel may be marked to constitute a scale or index by which at different stages of revolution corresponding variations in distances between contact points will be indicated. Such markings are shown in Fig. 1 in the shape of fractions representing fractions of an inch or other unit.

Between the pins are sockets 11, into which the bolt or latch 10 projects, said latch being free to move to and fro through the bearings 9 in order to engage with the sockets in the wheel, as above described.

In Figs. 2 and 3 are shown views of a modification of the device in the form of an attachment to be fitted to any calipers. Here another means for locking the wheel is shown, the same being a spring H, attached to the back of the device, as shown in Figs. 2 and 3, said spring having a projecting point or pin I, free to move in a hole in the back of the piece F and of sufficient length to project into small indents or notches in the back face of the wheel D, as shown in J, Fig. 2, said indents being so placed relatively to the pins or spokes of the wheel that when the pin I is pressed by the spring into an indent a corresponding spoke will be in position for measuring, as below described. The shank F has the socket or groove G, formed in such a way as to secure it firmly to the caliper-leg. I do not, however, confine myself to this means of attaching it.

The operation of the device is as follows: The caliper-legs are adjusted by means of the screw V and milled head P, Fig. 1, the wheel D being so turned that either the longest spoke 1 or the shortest spoke 8 is in position of contact-point, as shown in Fig. 1, the latch 10 or the spring and pin H and I, Fig. 3, holding the wheel firmly in position. Upon releasing the locking attachment—the latch or spring-pin— and on turning the wheel a new spoke differing in length from the first by a definite and known amount is brought into position, thus adjusting the distance between the contact-points definitely and to a known amount, as shown by the scale or index, greater or less than as first adjusted, according as the wheel is turned in one direction or another, and without changing the adjustment of the caliper-legs themselves, the operation being the same on either inside or outside calipers. I do not, however, limit myself to the above means and form of construction herein described.

What I claim, and desire to secure by Letters Patent, is—

1. In a measuring device, a wheel or cam suitably mounted and having one or more points on its periphery set eccentrically with reference to the center, whereby the distance between contact-points may be increased or diminished at will, substantially as described.

2. In a measuring device, the combination of ordinary calipers with a wheel suitably mounted, having one or more spokes or projections of unequal lengths from the center, varying from each other by a definite and certain amount, and provided with means for locking said wheel in position, and a graduated scale or index, substantially as described.

3. The combination, in a measuring device, of a body suitably mounted, comprising one or more contact-points whose motion about its axis increases or diminishes the distance between the measuring-points, means for locking the same, and a graduated scale or index adapted to indicate the amount of adjustment, substantially as and for the purposes set forth.

G. T. BECHTOL.

Witnesses:
T. WARREN BIRD,
JOHN W. LOVELAND.